(12) United States Patent
Ratnayake et al.

(10) Patent No.: US 9,109,101 B2
(45) Date of Patent: Aug. 18, 2015

(54) PROCESS FOR MAKING REINFORCING ELASTOMER-CLAY NANOCOMPOSITES

(75) Inventors: Upul Nishantha Ratnayake, Navinna (LK); Charminda Peiris, Pahala Biyanwila (LK); Nanda Fernando, Walana (LK); Sarathchandra Karunaratne, Meepe (LK); Veranja Karunaratne, Kandy (LK); Dileepa Prematunga, Wattegama (LK)

(73) Assignee: SRI LANKA INSTITUTE OF NANOTECHNOLOGY (PUT) LTD., Homagama (LK)

( * ) Notice: Subject to any disclaimer, the term of this patent is extended or adjusted under 35 U.S.C. 154(b) by 48 days.

(21) Appl. No.: 13/173,502

(22) Filed: Jun. 30, 2011

(65) Prior Publication Data

US 2012/0004347 A1 Jan. 5, 2012

Related U.S. Application Data

(60) Provisional application No. 61/360,403, filed on Jun. 30, 2010.

(51) Int. Cl.
| | |
|---|---|
| *C08L 7/00* | (2006.01) |
| *C08K 3/26* | (2006.01) |
| *C08K 3/34* | (2006.01) |
| *C08K 9/04* | (2006.01) |
| *C08L 15/00* | (2006.01) |

(52) U.S. Cl.
CPC ... *C08L 7/00* (2013.01); *C08K 3/26* (2013.01); *C08K 3/346* (2013.01); *C08K 9/04* (2013.01); *C08K 2201/011* (2013.01); *C08L 15/00* (2013.01)

(58) Field of Classification Search
CPC ....... C08L 7/00; C08L 19/003; C08K 3/0033; C08K 9/04
USPC ............ 523/346; 524/188, 262; 977/902, 773
See application file for complete search history.

(56) References Cited

U.S. PATENT DOCUMENTS

| | | | | |
|---|---|---|---|---|
| 4,386,169 | A * | 5/1983 | Artur et al. | 523/200 |
| 7,709,090 | B2 * | 5/2010 | Nover et al. | 428/403 |
| 2003/0144401 | A1 * | 7/2003 | Ajbani et al. | 524/445 |
| 2004/0214921 | A1 * | 10/2004 | Chaiko | 523/200 |
| 2005/0027062 | A1 * | 2/2005 | Waddell et al. | 524/496 |
| 2005/0277723 | A1 * | 12/2005 | Gong et al. | 524/445 |

* cited by examiner

*Primary Examiner* — Hannah Pak
(74) *Attorney, Agent, or Firm* — Alston & Bird LLP

(57) ABSTRACT

A process for producing a natural rubber nanocomposite containing exfoliated organically modified montmorillonite and maleic anhydride grafted elastomer in a dispersion of natural rubber and reinforcing filler/inert filler wherein the cured nanocomposite has improved mechanical properties compared to conventional rubber compound containing a mixture of the reinforcing filler, carbon black and the inert filler, $CaCO_3$.

12 Claims, 14 Drawing Sheets

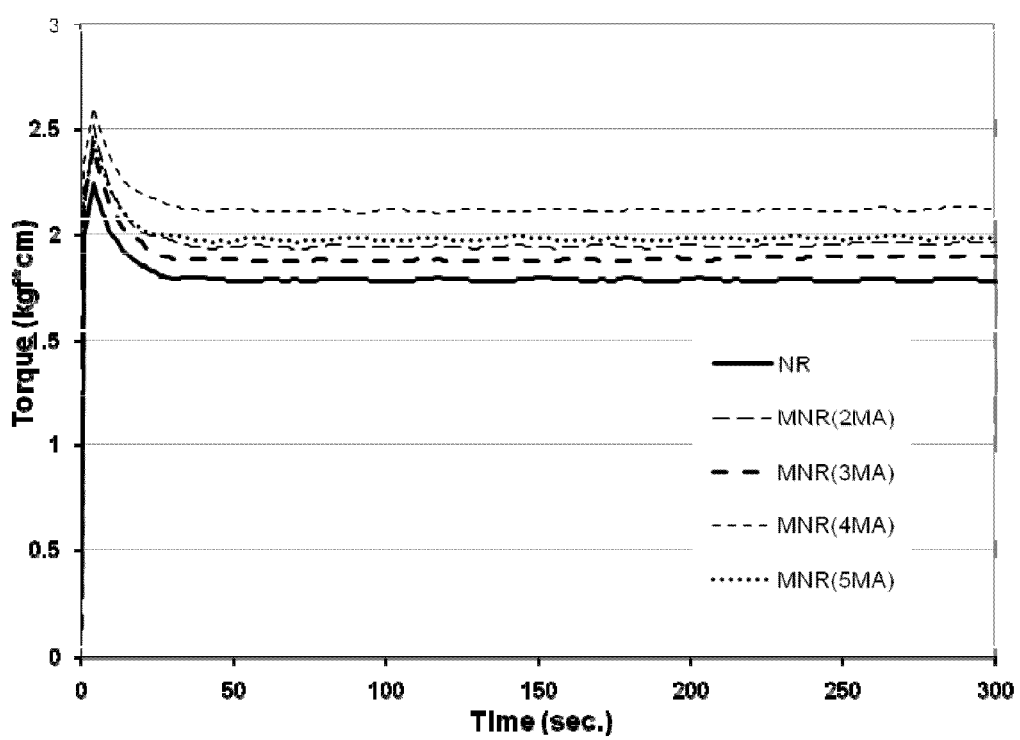
Figure 1: Effect of maleic anhydride grafting on low shear rate viscosity (torque values)

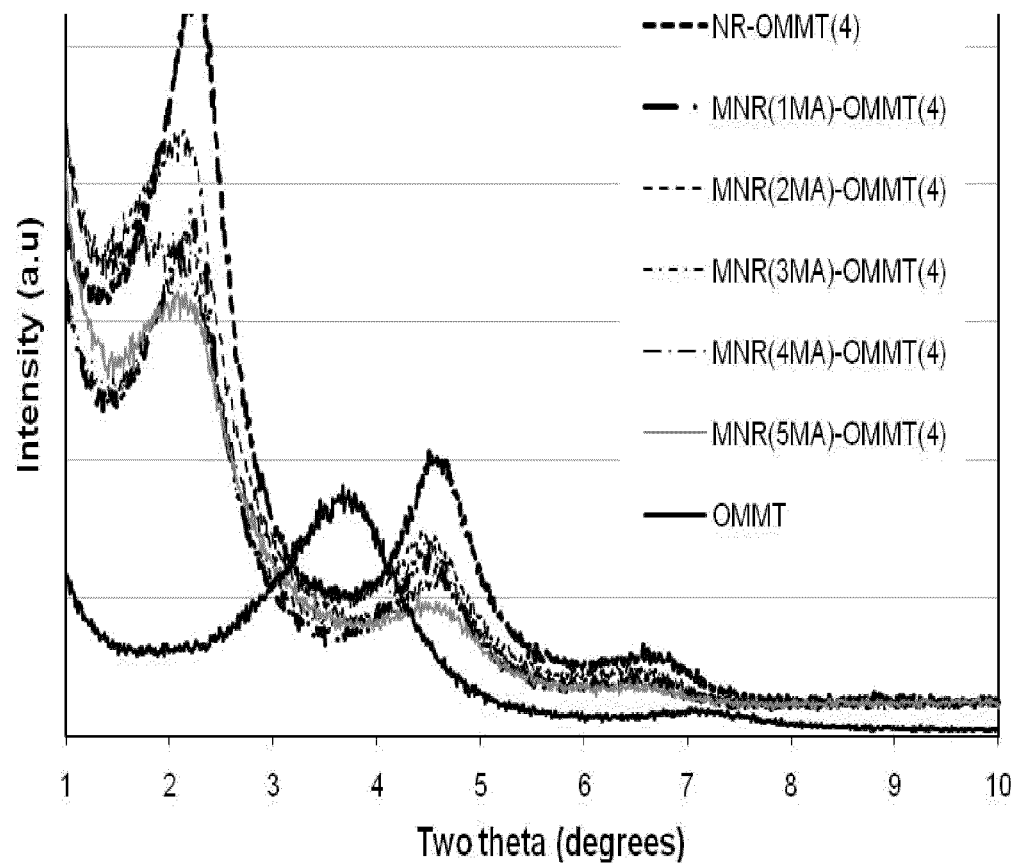
Figure 2: X-ray diffraction patterns for MNR-OMMT(4) composites containing different concentrations of maleic anhydride in maleated natural rubber (MNR)

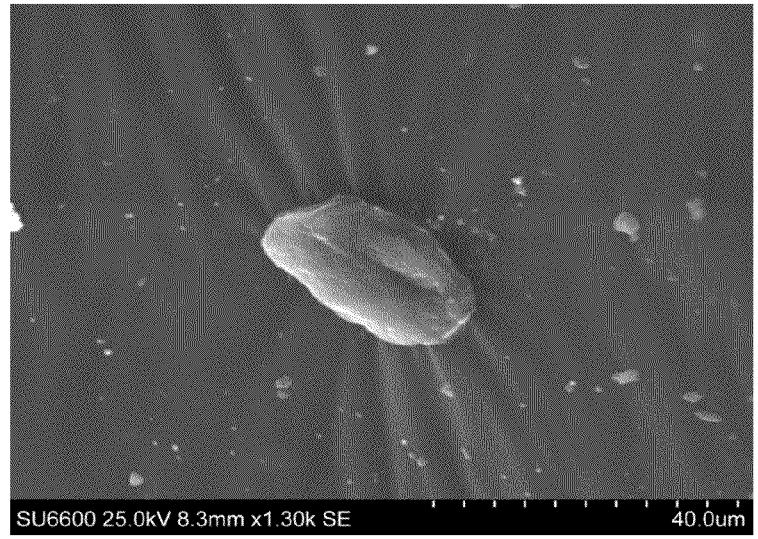
(a)
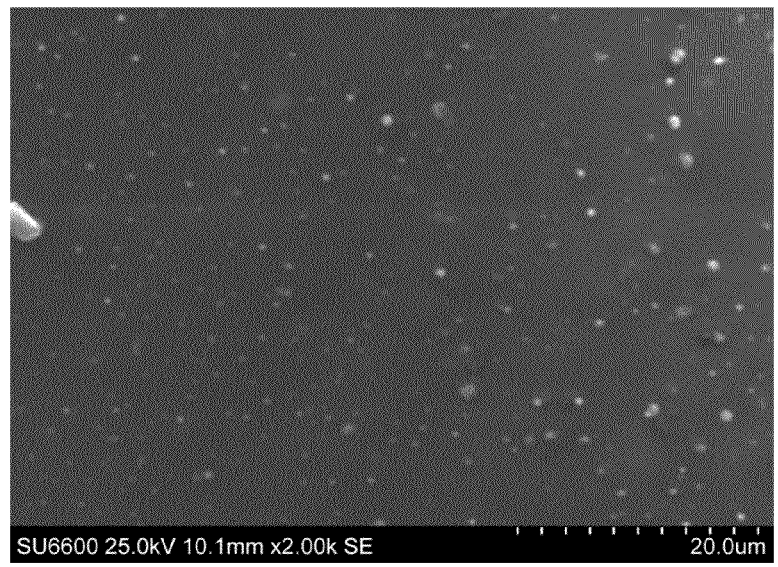
(b)
Figure 3: SEM micrographs of composites (a) NR-OMMT(4) composite, (b) MNR(4MA)-OMMT(4) composite

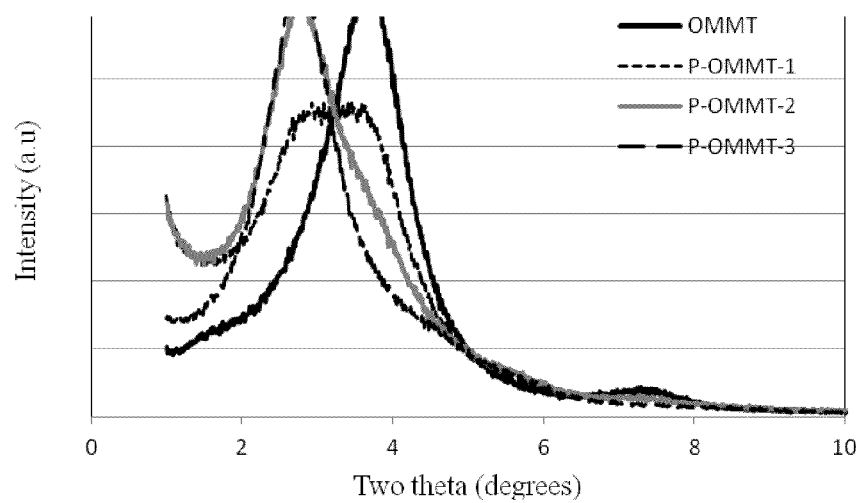
Figure 4: X-ray diffraction spectra of polyethylene glycol (PEG) treated OMMT (P-OMMT) clay powders

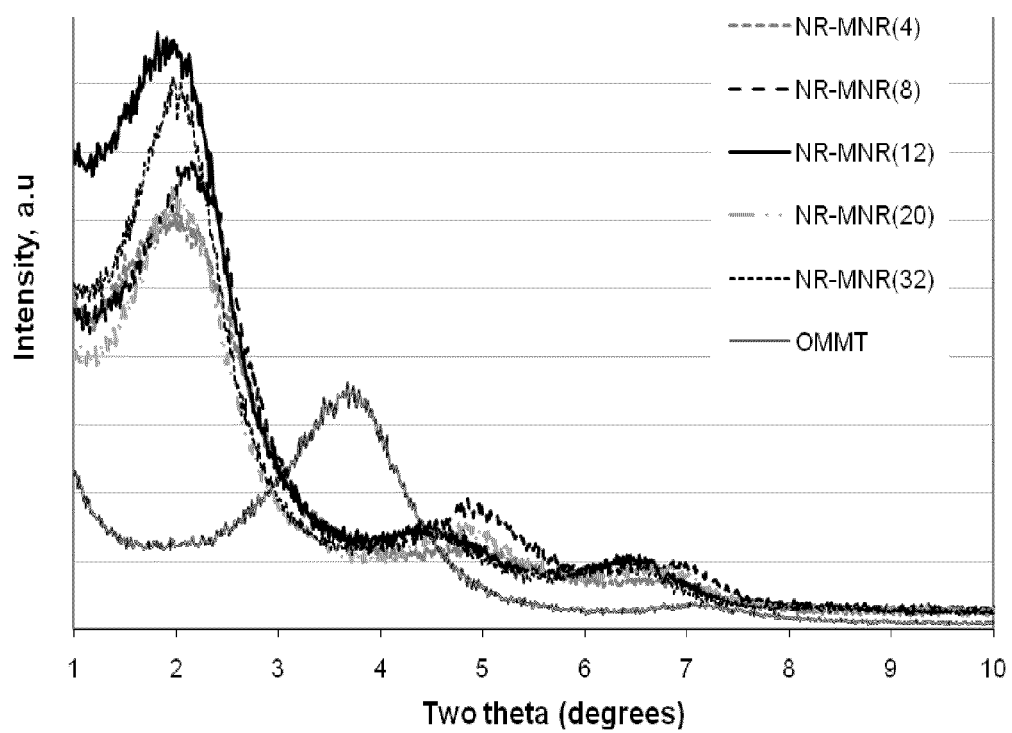
Figure 5: X-ray diffraction patterns for NR-MNR-OMMT nanocomposites prepared with different ratio of MNR to OMMT.

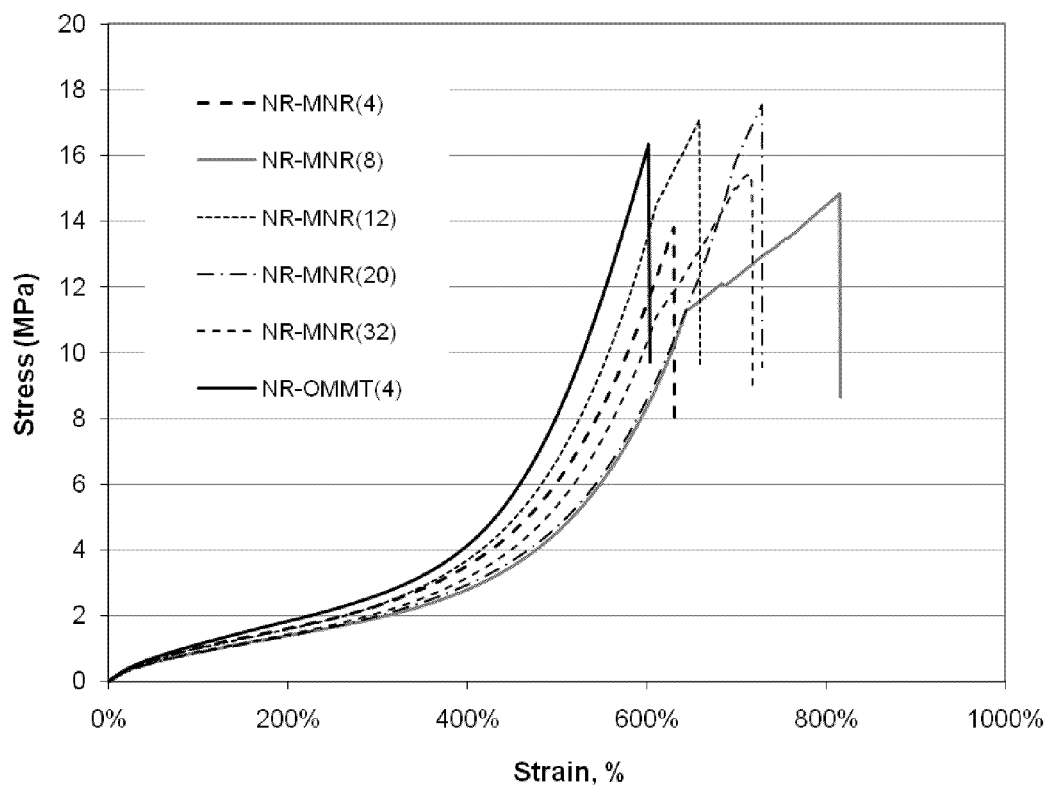
Figure 6: Stress-Strain curves for NR-MNR-OMMT nanocomposites prepared with different ratios of MNR to OMMT

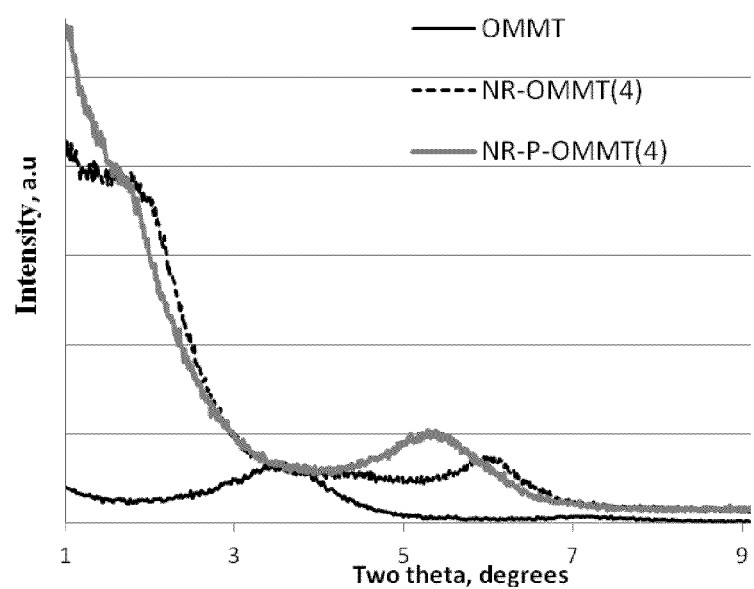
Figure 7: X-ray diffraction spectra of NR/P-OMMT and NR/OMMT nanocomposite

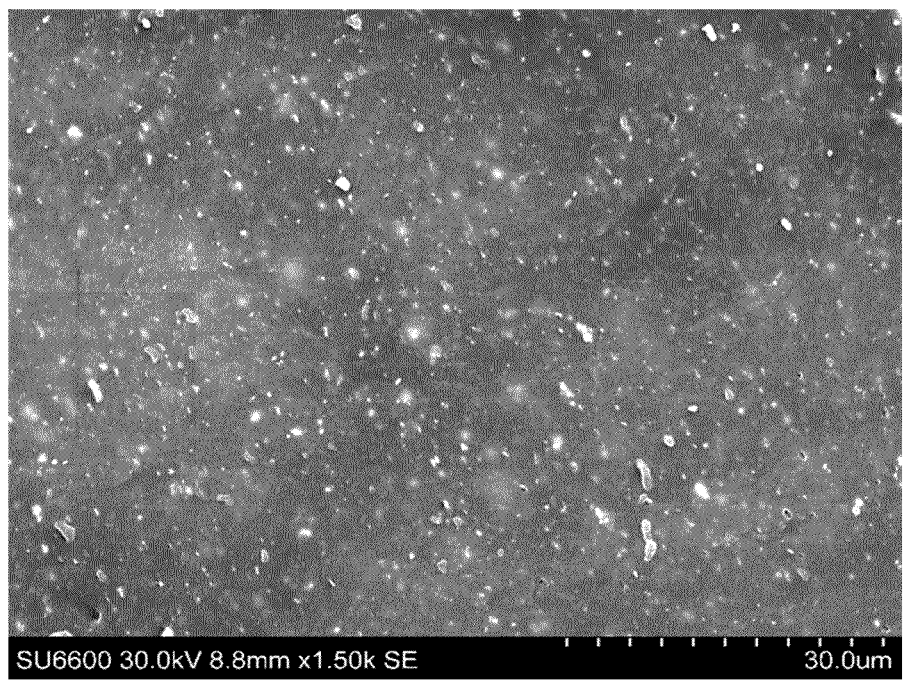
Figure 8: SEM micrographs of NR/P-OMMT nanocomposite

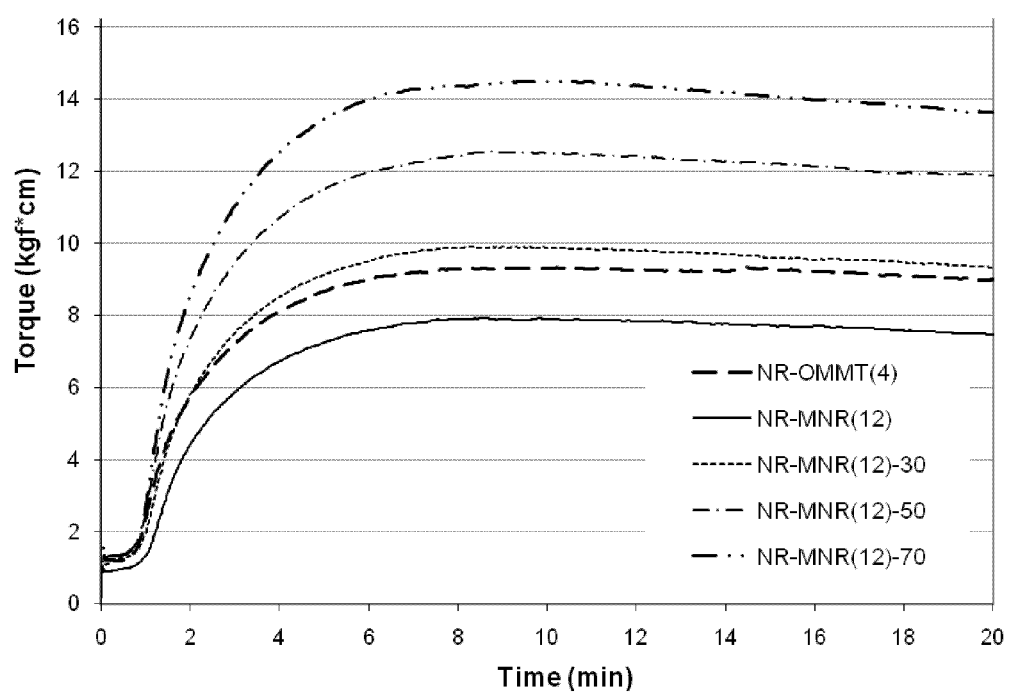
Figure 9: Rheographs for NR-MNR(12) nanocomposites prepared with different loading levels of $CaCO_3$

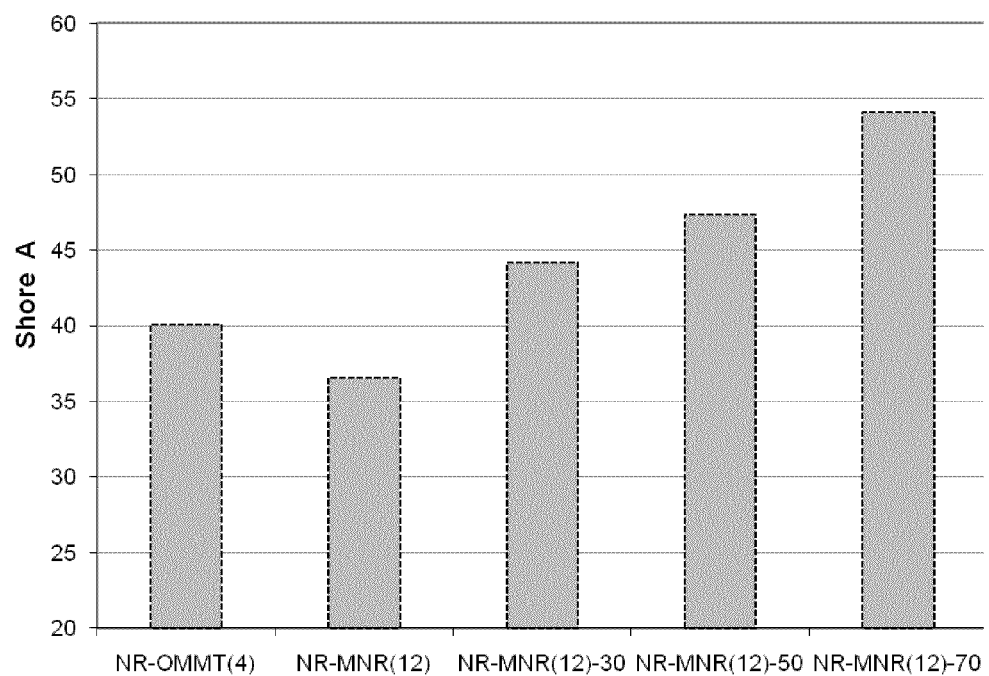
Figure 10: Effect of CaCO3 loading levels on hardness of NR-MNR-OMMT nanocomposites

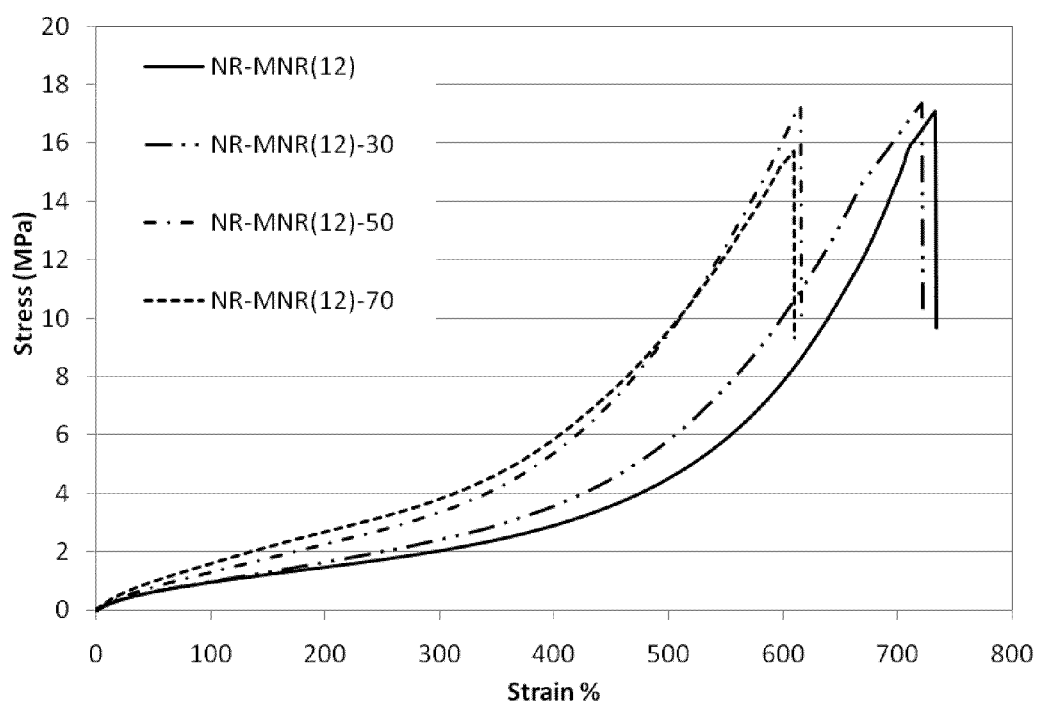
Figure 11: Stress-strain curves for NR-MNR(12)-OMMT nanocomposites prepared with different loading levels of CaCO$_3$

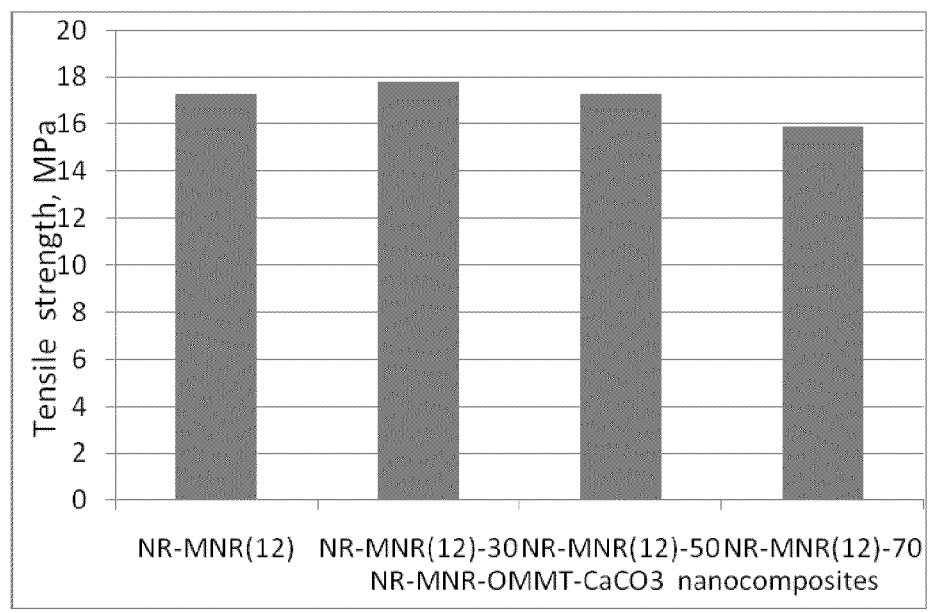
Figure 12: Tensile strength of NR-MNR(12)-OMMT nanocomposites prepared with different loading levels of $CaCO_3$

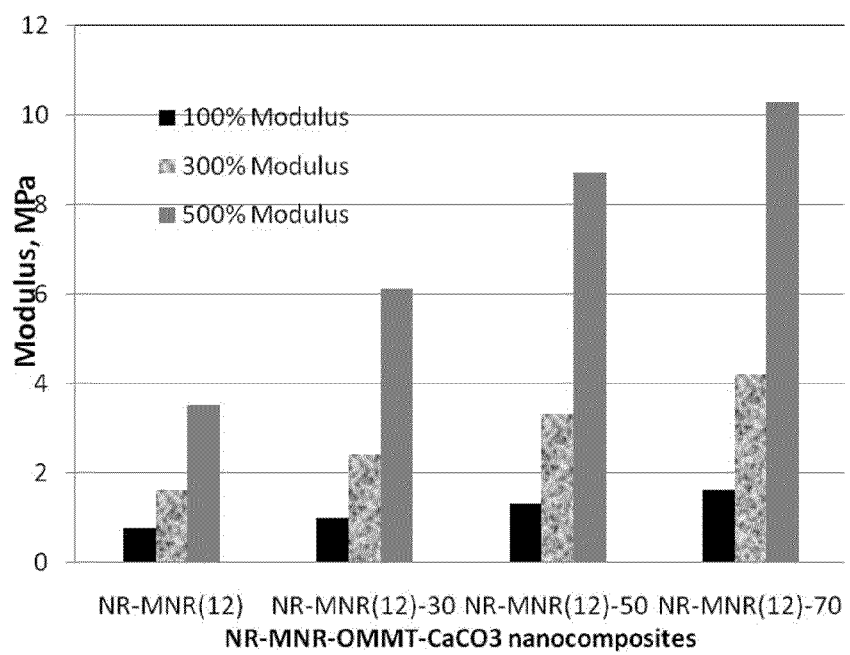
Figure 13: Tensile modulus of NR-MNR(12)-OMMT nanocomposites prepared with different loading levels of $CaCO_3$

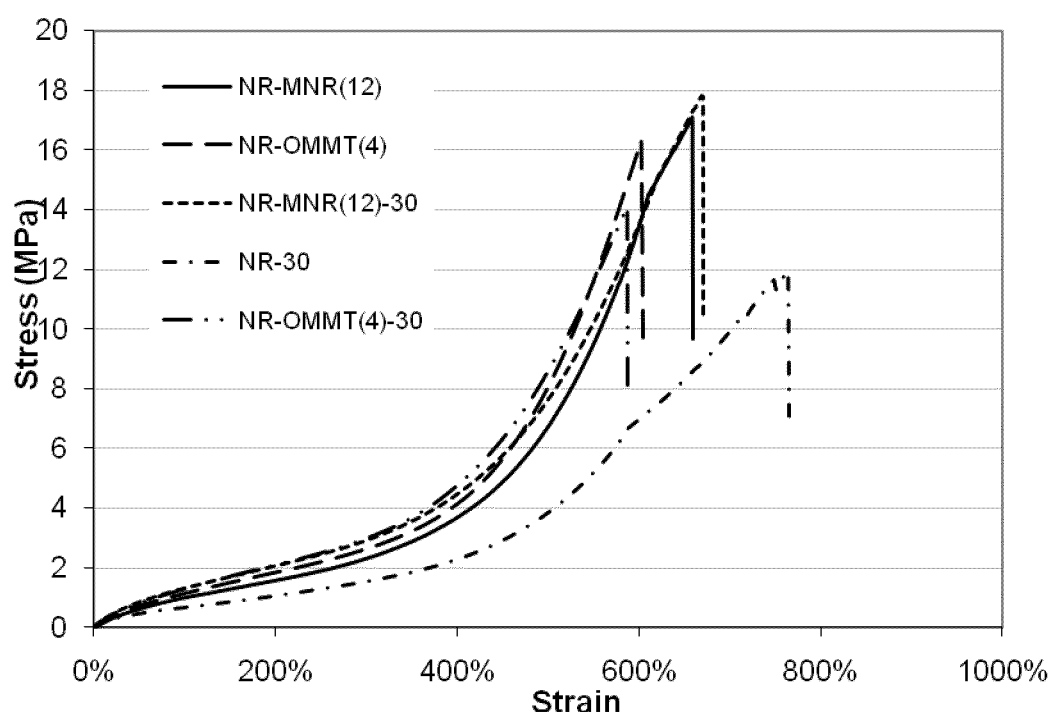
Figure 14: Comparison for stress-strain curves for NR-OMMT nanocomposites and conventional composites

PROCESS FOR MAKING REINFORCING ELASTOMER-CLAY NANOCOMPOSITES

CROSS-REFERENCE TO RELATED APPLICATIONS

This application claims priority under 35 U.S.C. §119 of a provisional application Ser. No. 61/360,403, filed Jun. 30, 2010, which application is hereby incorporated by reference in its entirety.

FIELD OF THE INVENTION

A process of making elastomer-clay nanocomposites for solid tire applications.

BACKGROUND OF THE INVENTION

Polymeric nanocomposites are produced to enhance material performance or to achieve functional properties such as electrical, thermal, barrier and antimicrobial compared to conventional polymeric composites. Polymeric nanocomposites are a new class of materials that contain an organic polymer and inorganic particles dispersed at nanoscale (1-100 nm) within the polymeric matrix. Specifically, polymeric nanocomposites based on layered phyllosilicates have been used extensively in industry since they show significant property enhancement compared to those of pure polymer or conventional filled polymeric composites.

Particularly, elastomeric nanocomposites containing phyllosilicate clay provide improvements in properties such as mechanical, electrical and thermal. In addition, new functionality such as improved barrier and flame retardant properties may also be introduced to the elastomeric compound. Generally, phyllosilicate clay is converted into organophilic clay by intercalating organic molecules, preferably tertiary alkyl ammonium ions, since hydrophilic clays are not in general compatible with elastomers.

Elastomeric nanocomposites are prepared by polymerizing, in situ, the elastomeric monomer in the presence of organophilic phyllosilicate clays or by intercalating the elastomer into clay in solution or by direct melt mixing the elastomer in the presence of clay. As most elastomers including natural rubber (NR) are available in the solid or latex form, intercalation of layered silicates either by direct melt mixing with dry rubber or in solution are industrially feasible techniques and are used to prepare rubber nanocomposites that contain phyllosilicate clays that are exfoliated or separated. Exfoliation of layered silicates into individual layers or platelets with 1 nm thickness and dispersion of them homogeneously in the rubber matrix, gives rise to the rubber-layered silicate nanocomposites. The degree of exfoliation significantly affects the material properties.

Depending on the dispersion of layered phyllosilicates in the rubber matrix, rubber-layered silicate nanocomposites can be categorized into two ideal structures: intercalated or exfoliated. When rubber intercalates into the interlayer spacing of the clay resulting in an alternating elastomer and clay structure, it gives rise intercalated nanocomposites. In an exfoliated nanocomposite structure, elastomer intercalates or diffuses into the layered silicates. The clay particles are then separated into their primary platelets, where individual clay layers are of 1 nm thickness, and dispersed uniformly in a continuous elastomer matrix. Since exfoliation of the clay is the key factor in the enhancement of properties, various exfoliation techniques have been developed to prepare rubber nanocomposites containing layered phyllosilicates.

WO/2008/068543 discloses production of elastomeric nanocomposites containing organophilic nanoclay and carbon black, in which organically modified nanoclay is melt mixed with elastomers. WO/2008/045029 discloses exfoliated clay nanocomposites of star branched elastomer. US 2005/0277723 discloses clay elastomer nanocomposites, and functionalized carboxylic acid or ester groups having pendant elastomer units for improved air barrier properties of tire liners. US 2003/0191224 disclose nanocomposites for tire liner compositions containing organically modified clay having an ammonium group and an amino group. US 1998/5807629 discloses an elastomer/layered material nanocomposite with low air permeability to be used as a tire liner, wherein the nanocomposite was obtained by dispersing a layered material in an elastomer containing functionalized copolymer of isobutylene and isoprene.

US 2004/6759464 discloses a nanocomposite functionalized elastomeric polymer which is pre-intercalated or partially exfoliated with clay in an aqueous medium. Aqueous dispersions of the elastomer and the clay were used to form nanocomposites containing reinforcing agents. US1999/5973053 discloses nanocomposites that are formed by making clay composite intercalated with an onium ion and an organic molecule having a polar group clay composite material is mixed with a rubber material rubber nanocomposite is formed by solvent or melt-mixing methods.

Given the above, it would be advantageous to have a melt mixing method to produce exfoliated nanocomposites for property enhancement while reducing the cost by including inert fillers.

Particularly the increase in tensile strength and modulus by using melt mixing without the use of solvents are desirable in terms of manufacturing ease.

BRIEF SUMMARY OF THE INVENTION

Accordingly, disclosed herein is a method to prepare a natural rubber nanocomposite containing organically modified montmorillonite (OMMT), reinforcing filler, inert filler, and a functionalized natural rubber as an exfoliating promoter. Direct melt mixing of OMMT and inert filler/reinforcing filler have also been used to achieve the maximum level of exfoliation and cost reduction. The maximum level of exfoliation of OMMT within the elastomer can lead to property enhancement. An embodiment, natural rubber nanocomposite containing OMMT, maleated natural rubber (MNR) as the exfoliation promoter and inert filler/reinforcing filler is suitable for manufacture of solid rubber tires. In an embodiment the natural rubber-clay nanocomposite has been used as the middle layer of a solid rubber tire.

An embodiment relates to the preparation of natural rubber nanocomposite containing OMMT, inert filler ($CaCO_3$) and maleated natural rubber (MNR) with high strength characteristics. In another embodiment, preparation of the natural rubber containing low molecular weight polyethylene glycol (PEG) treated OMMT, inert filler/reinforcing filler and maleated natural rubber (MNR) creates a compound with higher tensile properties.

In an embodiment, the high strength characteristics are obtained whilst maintaining higher rebound resilience and less heat build-up properties. In certain embodiments addition of up to 70 phr (parts per hundred of rubber) of $CaCO_3$ into the nanocomposite does not significantly deteriorate the property enhancement.

In another embodiment the natural rubber nanocomposite containing exfoliated OMMT and $CaCO_3$ was incorporated into the middle compound of a solid rubber tire where the strength characteristics were maintained as compared to a conventional rubber compound containing a mixture of natural rubber, carbon black and $CaCO_3$.

DESCRIPTION OF THE FIGURES

FIG. 1: Effect of maleic anhydride grafting on low shear rate viscosity (torque values).

FIG. 2: X-ray diffraction patterns for MNR-OMMT(4) composites containing different concentrations of maleic anhydride in maleated natural rubber (MNR).

FIG. 3: SEM micrographs of (a) NR-OMMT(4) composite (b) MNR(4MA)—OMMT(4) composite.

FIG. 4: X-ray diffraction spectra of polyethylene glycol (PEG) treated OMMT (P-OMMT) clay powders.

FIG. 5: X-ray diffraction patterns for NR-MNR-OMMT nanocomposites prepared with different ratios of MNR to OMMT.

FIG. 6: Stress-strain curves for NR-MNR-OMMT nanocomposites prepared with different ratios of MNR to OMMT.

FIG. 7: X-ray diffraction spectra of NR/P-OMMT nanocomposite.

FIG. 8: SEM micrographs of NR/P-OMMT nanocomposite.

FIG. 9: Rheographs for NR-MNR(12)-OMMT nanocomposites prepared with different loading levels of $CaCO_3$.

FIG. 10: Effect of $CaCO_3$ loading levels on hardness of NR-MNR(12)-OMMT nano composites.

FIG. 11: Stress-strain curves for NR-MNR(12)-OMMT nanocomposites prepared with different loading levels of $CaCO_3$.

FIG. 12: Tensile strength of NR-MNR(12)-OMMT nanocomposites prepared with different loading levels of $CaCO_3$.

FIG. 13: Tensile modulus of NR-MNR(12)-OMMT nanocomposites prepared with different loading levels of $CaCO_3$.

FIG. 14: Comparison of stress-strain curves for NR-OMMT nanocomposites and conventional composites.

DETAILED DESCRIPTION OF THE INVENTION

The present invention includes following features: natural rubber, organically modified phyllosilicate, PEG treated organically modified phyllosilicate, exfoliation promoter, reinforcing filler, and inert filler.

Phr referred to herein is defined as parts per hundred of rubber in preparation of the rubber compounds.

As referred to herein a curing system or vulcanization is a chemical process for converting rubber into more durable materials via the addition of one or more of the following: sulfur, accelerators, activators, antioxidants and antiretardents. These additives modify the polymer by forming crosslinks (bridges) between individual polymer chains. Vulcanized material is less sticky and has superior mechanical properties.

Exfoliation referred to herein is the separation of layered phyllosilicates into individual layers commonly found as platelets. These platelets are about 1 nm thick and are dispersed homogeneously within the elastomeric matrix. Independent of the technique used to prepare the elastomer-clay nanocomposite, the degree of exfoliation significantly affects the material properties of the cured elastomer (elastomer vulcanizate).

Reinforcement referred to herein is improving the mechanical properties (tensile strength, tensile modulus, hardness) of the rubber compound by adding reinforcing fillers. Reinforcing fillers typically include organically modified phyllosilicate clay, carbon black, $CaCO_3$ coated with long chain fatty acids such as stearic acid or octadecanoic acid (coated $CaCO_3$), or silica. Inert fillers are typically non-reinforcing and can typically be kaolin (clay), $CaCO_3$, coated $CaCO_3$, and $TiO_2$.

Intercalation as referred to herein is diffusion of an organic molecule/polymer molecule into the interlayer spacing of the phyllosilicate clay.

Exfoliation promoter referred to herein is maleic anhydride grafted natural rubber (maleated natural rubber) which is compatible with layered phyllosilicate clay and the elastomer.

Vulcanization accelerators as referred to herein are compounds that lower the activation energy of the vulcanization reaction. Without limitation, examples of commonly used vulcanization accelerators are MBTS (Mercaptobenzothiazole disulphide), MBS (N-morpholinothio-benzothiazole), CBS (N-cyclohexylbenzothiazole-2 sulfenamide), and TBBS (N-butylbenzothiazole-2-sulfenamide).

Tensile strength referred to herein is the measure of strength characteristics of the elastomer-clay nanocomposite vulcanizate and is measured by the ISO 37: 2005 (E).

Grafting referred to herein is the chemical attachment of the cyclic anhydride to the elastomer at high temperature. The elastomer referred to herein includes natural rubber or synthetic rubbers. Suitable molecules for grafting are unsaturated polar molecules such as unsaturated anhydrides of dibasic acids. Examples are maleic anhydride, crotonic anhydride and itaconic anhydride.

As referred to herein, rebound resilience is the measure of elasticity of a rubber compound and is measured as the ratio of the energy returned to the energy applied when the rubber compound is deformed and returns to its original shape. Rebound resilience is measured by ISO 4662-1986 (E).

As referred to herein, the heat build-up is the temperature rise in a rubber compound when the rubber is subjected to compressive cyclic deformation and is measured by Goodrich Flexometer heat build-up method, ASTM D623.

As referred to herein, the middle compound of a solid rubber tire is the central layer of the tire which is placed in between the tread layer and base layer of the tire.

Nanocomposite referred to herein is the heterogeneous mixture of elastomer, exfoliation promoter, exfoliated OMMT, inert filler, reinforcing filler, curing agents and other ingredients.

Elastomer

High molecular weight polymeric materials with elastic properties are typically natural or synthetic rubber. Natural rubber is an elastomer derived from colloids found in the sap of some plants. The plants are 'tapped', by making an incision into the bark of the tree and the latex sap is collected and refined into a usable rubber. The purified form of natural rubber is cis-1,4-polyisoprene. Natural rubber which generally has an average molecular weight of $10^5$ to $10^6$ g/mol is used extensively in many applications and products. Natural rubber used in tire production is Ribbed Smoked Sheet (RSS). In general rubber vulcanizate is made by incorporating fillers (reinforcing and/or inert/non reinforcing), curing agents, and other ingredients such as protective agents and then vulcanizing at high temperatures (130-160° C.).

Exfoliation Promoter

Natural rubber grafted with an unsaturated polar molecule, preferably maleic anhydride, is used as an exfoliation promoter. In an embodiment maleated natural rubber intercalates into the interlayer spacing of phyllosilicate clay, during the melt mixing process. Since the polar component of the maleated natural rubber is compatible with OMMT and non polar component (natural rubber) is compatible with the bulk matrix, clay particles are intercalated and subsequently separated into individual layers of 1 nm thickness or multiple layers of several nm thickness in the natural rubber matrix, during the melt mixing process.

Phyllosilicate Clay

Smectite type clay, which belongs to structural family of 2:1 layered silicates, in which an octahedral alumino layer is sandwiched in between two tetrahedral silicate layers, is used in this invention. Common smectite type clays used in polymeric nanocomposites are montmorillonite, hectorite, laponite, and saponite. In this invention, organically modified montmorillonite (OMMT) is used.

Reinforcing Agents

Carbon black is widely used as the reinforcing agent in rubber compounds. In certain embodiments, OMMT was used to replace the environmentally unfriendly carbon black either fully or partially as the reinforcing agent. In an embodiment, required reinforcement of the rubber-clay nanocomposite is achieved with very low (2-8 phr) loading levels of OMMT. In contrast, when carbon black is used, high loading levels are required to achieve the same reinforcement levels. In another embodiment 4 phr of OMMT was used as the reinforcing agent. In yet another embodiment 4 phr of OMMT and 15 phr of carbon black were used as the reinforcing agents. In general, reinforcing fillers are incorporated into rubber compounds in order to enhance the mechanical properties such as tensile properties. Carbon black and silica are the most commonly used reinforcing fillers in the rubber industry. Interactions between reinforcing fillers and the rubber matrix result in enhanced tensile properties. High loading levels, typically over 30 phr, of carbon black can reduce the elasticity of rubber compounds. In contrast to reinforcing fillers, inert fillers or non-reinforcing fillers such as $CaCO_3$, kaolin (clay), or coated $CaCO_3$ are added as a diluent to reduce cost. However, some inert fillers reduce the strength of the cured rubber compound (rubber vulcanizate).

In certain embodiments, incorporation of $CaCO_3$ as the filler into the nanocomposite comprising natural rubber, maleated natural rubber, and OMMT does not deteriorate the mechanical properties. In an embodiment the tensile strength of 30 phr loading of $CaCO_3$ in the nanocomposite comprising natural rubber, maleated natural rubber, and OMMT was 17.8 MPa. This tensile strength was comparable with the tensile strength of rubber-clay nanocomposite without $CaCO_3$. In another embodiment the tensile strength of 70 phr loading of $CaCO_3$ in the nanocomposite comprising natural rubber, maleated natural rubber, and OMMT was 16 MPa. Surprisingly, the rubber nanocomposite comprising OMMT and $CaCO_3$ maintains the mechanical properties without affecting the elasticity of the cured rubber.

Melt Mixing

Preparation of natural rubber/OMMT nanocomposites can be made by direct melt intercalation of OMMT with natural rubber in the presence of maleated natural rubber. Direct melt compounding process is preferred to solution intercalation and in situ polymerization techniques for the preparation of rubber-clay nanocomposites. This is because melt mixing technique is an environmentally friendly and industrially feasible alternative.

Different mixing cycles for the melt mixing of OMMT and $CaCO_3$ can be employed in order to determine the maximum degree of exfoliation of OMMT within the rubber matrix. Exfoliation is not significantly changed after curing. In an embodiment, different loading levels of $CaCO_3$ were melt blended with natural rubber, 12 phr of maleated natural rubber and 4 phr of OMMT. In an embodiment the nanocomposite structure comprising $CaCO_3$ was analyzed for curing and mechanical properties. Curing properties were measured by using a Moving Die Rehometer. The melt blending can be done in mixers such as Haake Internal Mixer (Torque rheometer). The mixing cycle of adding of natural rubber, OMMT, maleated natural rubber and $CaCO_3$ can be optimized in order to enhance the properties such as tensile properties and hardness of the natural rubber/OMMT nanocomposite. Mixing characteristics influence exfoliation and dispersability of OMMT in the rubber matrix. In an embodiment, by mixing first at a higher shear rate (rotor speed of 80 rpm) followed by a lower shear rate (rotor speed of 60 rpm), maximum exfoliation and dispersibility of OMMT within the rubber matrix was achieved. This was evidenced by tensile property enhancement up to 17.8 MPa.

In an embodiment the degree of exfoliation of OMMT was directly proportional to the tensile strength of the rubber-clay nanocomposite.

In another embodiment, different loading levels of $CaCO_3$ were melt blended with the formulation of natural rubber/OMMT nanocomposite containing maleated natural rubber. Typical loading levels were 30 phr, 50 phr, 70 phr, and 90 phr of $CaCO_3$.

The particle size of $CaCO_3$ can vary between 50 nanometers to 5 microns.

Solid Rubber Tire

Typically a solid rubber tire consists of three layers: the base layer, the middle layer, and the tread. The middle layer and the tread do not contain any steel wire whereas the base layer contains steel wires for the reinforcement of the tire. The middle layer typically consists of a soft natural rubber compounds (60 Shore A) having good resistance to heat build up and rolling resistance. All three parts can contain carbon black as a reinforcing filler. In the middle compound, typically a mixture of $CaCO_3$ (50-90 phr) and carbon black (30-50 phr) are used as fillers. Fillers are also incorporated into the compounds based on the desired performance of the tire. Carbon black is used as a reinforcing filler. Curing chemicals are added to the compound to encourage elasticity of the rubber. In an embodiment natural rubber nanocomposite containing OMMT, inert filler ($CaCO_3$) and maleated natural rubber (M-NR) with high strength characteristics were used as the middle compound. In another embodiment, natural rubber nanocomposite containing PEG treated OMMT, maleated natural rubber, reinforcing filler (carbon black) and inert filler ($CaCO_3$) with improved mechanical performances were used as the middle compound. High strength characteristics are obtained whilst maintaining improved rebound resilience and less heat build up properties. In certain embodiments addition of up to 70% $CaCO_3$ into the nanocomposite does not significantly deteriorate the property enhancement.

The base rubber layer is composed of a hard rubber compound reinforced by reinforcing materials. Typically, the hardness of the hard rubber compound is about 90 Shore A, and the reinforcing materials are chopped fiber cords used in a conventional tire carcass cord.

Sulfur allows the rubber to cross-links between the carbon backbones of adjacent natural rubber molecules when the rubber compound is heated. Cross-linking increases the strength of the rubber by preventing rubber chains from slipping past one another. Tire compounds typically contain low amounts of sulfur (1-5 phr) to prevent too many cross-links forming which causes the rubber to become hard. The solid tire process is described in patent WO/2005/016975.

The present invention is further described by the examples which follow. Such examples, however, are not to be construed as limiting in any way either the spirit or the scope of the present invention.

EXAMPLES

Elastomer/clay nanocomposites comprising natural rubber (RSS) and organically modified clay (OMMT) have been prepared by melt blending of natural rubber with OMMT using a Haake Internal Mixer (Torque rheometer). Montmorillonite clay modified with dimethyldyhydrogenated tallow quarternery ammonium chloride (Cloisite 20A) was used as the organically modified clay (OMMT). Cloisite 20 was purchased from Southern Clay Products, USA.

Example 1

Use of Maleated Natural Rubber (MNR) as an Exfoliating Promoter Grafting of Maleic Anhydride onto Natural Rubber Maleated natural rubber (MNR) was prepared by the melt mixing of natural rubber and maleic anhydride in a laboratory scale Internal Mixer (Haake Rheomix 600) at 145° C. Initially natural rubber (RSS grade of natural rubber) was masticated in the Internal Mixer at a rotor speed of 60 rpm at 145° C. for 2 min. Different concentration of maleic anhydride was incorporated into the Internal Mixer and mixing with the natural rubber was continued for further 8 min. The composition of each maleated natural rubber is shown in Table 1. Maleated natural rubber was characterized by the Moving Die Rheometer in order to determine the grafting efficiency. FIG. 1 shows the torque values for maleated natural rubber samples with different concentrations of maleic anhydride (from 1-5 phr) obtained from a Moving Die Rheometer operated at 60° C. for 5 min. Since torque values of Moving Die Rheometer directly relate to the shear viscosity, minimum torque values shown in FIG. 1 are a clear indication of shear flow properties (shear viscosity) of maleated natural rubber. Grafting of maleic anhydride (MA) onto natural rubber increases the molecular weight of maleated natural rubber and as a result shear viscosity should also be increased. As shown in FIG. 1, maleated natural rubber compounds show increased minimum torque (ML) than pure natural rubber. This clearly shows that natural rubber was grafted with MA during the melt mixing process carried out in the internal mixer at the temperature of 145° C.

TABLE 1

Composition of maleated natural rubber compounds

| Maleated natural rubber* | Natural rubber (RSS) phr | Maleic anhydride Phr** |
|---|---|---|
| MNR(1MA) | 100 | 1 |
| MNR(2MA) | 100 | 2 |
| MNR(3MA) | 100 | 3 |
| MNR(4MA) | 100 | 4 |
| MNR(5MA) | 100 | 5 |

*Maleic anhydride levels (phr) in the maleated natural rubber is shown within the parenthesis
**Parts per hundred of natural rubber Example 2

Melt Mixing of Maleated Natural Rubber (MNR) Prepared in the Example 1 with Organically Modified Montmorillonite (OMMT)

Maleated natural rubber prepared in Example 1 was melt blended with OMMT (montmorillonite modified with dimethyl dyhydrogenated tallow quaternary ammonium chloride), using the Internal Mixer operating at 60° C. and at a rotor speed of 80 rpm. The mixing time was 8 min maleated natural rubber/OMMT composite structure was characterized using an X-ray diffractometer to evaluate the intercalation and exfoliation behavior of OMMT in the maleated natural rubber matrix.

The X-ray diffraction spectra of maleated natural rubber/OMMT composites and the interlayer spacing of each composite are shown in FIG. 2 and Table 2, respectively. All maleated natural rubber/OMMT composites consists of 4 phr of OMMT.

As shown in FIG. 2, X-ray diffraction peaks (001) of MNR-OMMT(4) composites shifted towards the lower Bragg angle in comparison to the diffraction peak of OMMT. This is attributed to the fact that molecules of maleated natural rubber diffuse (intercalate) into the OMMT gallery during the melt compounding process. Polar groups of the maleic anhydride would be the thermodynamic driving force for the intercalation of maleated natural rubber into the OMMT clay gallery. However, the highest interlayer distance of 44.1 Å (Table 2) for OMMT is achieved when MNR (4MA) (natural rubber was grafted with 4 phr of maleic anhydride) was melt compounded with 4 phr of OMMT. This implies that the most effective intercalation occurs with MNR(4MA). Hence, MNR (4MA) is selected as the most suitable maleated natural rubber for the intercalation of OMMT.

TABLE 2

Interlayer spacing of OMMT in maleated natural rubber (MNR) composite

| MNR/OMMT composite* | Peak position Two theta (°) | Interlayer spacing $(d_{001})$, Å |
|---|---|---|
| OMMT | 3.71 | 23.7 |
| NR-OMMT(4) | 2.26 | 40.6 |
| MNR(1MA)-OMMT(4) | 2.19 | 40.2 |
| MNR(2MA)-OMMT(4) | 2.13 | 41.4 |
| MNR(3MA)-OMMT(4) | 2.18 | 40.4 |
| MNR(4MA)-OMMT(4) | 2.00 | 44.1 |
| MNR(5MA)-OMMT(4) | 2.11 | 41.8 |

*OMMT level (4 phr) is given within parenthesis

As shown in FIG. 3, Scanning Electron Microscope (SEM) images of NR-OMMT(4) and MNR(4MA)-OMMT(4) further confirm that maleated natural rubber intercalates into OMMT interlayer spacing and as a result exfoliate and disperse OMMT uniformly throughout the NMR matrix compared to that of OMMT in NR matrix (FIG. 3(a)).

Example 3

Preparation of Low Molecular Weight Polyethylene Glycol (Peg) Treated Organically Modified Montmorillonite (OMMT)

OMMT is physically ground with a low molecular weight PEG oligomer using a motor and pestle at different ratios. The mixture containing OMMT and PEG is heat treated in an oven at 80° C. for 1 hr. The molecular weight of the PEG used in this experiment is 4000 g/mol. The structure of PEG treated OMMT (P-OMMT) clay powder is characterized using X-ray diffraction technique in order to evaluate the intercalation (diffusion) of PEG oligomer molecules into the interlayer of spacing of OMMT clay during the heat treatment.

FIG. 4 shows the X-ray diffraction spectra of P-OMMT clay prepared by mixing of OMMT and PEG at different ratios whilst interlayer spacing of P-OMMT samples and their compositions are shown in Table 3.

TABLE 3

Compositions and interlayer spacing of OMMT treated with low molecular weight PEG (P-OMMT)

| PEG treated OMMT(P-OMMT) | OMMT:PEG ratio | Peak position (degrees) | Interlayer distance\ (Å) |
|---|---|---|---|
| OMMT | 1:0 | 3.71 | 23.7 |
| P-OMMT-1 | 1:0.25 | 2.95 | 29.9 |
| P-OMMT-2 | 1:0.5 | 2.81 | 31.4 |
| P-OMMT-3 | 1.0.75 | 2.7 | 31.9 |

All x-ray diffraction peaks relevant to PEG treated samples (P-OMMT-1, P-OMMT-2 and P-OMMT-3) shifted to lower Bragg angles (FIG. 4) compared to that of X-ray diffraction peak of OMMT. As shown in Table 3, interlayer spacing of P-OMMT samples is increased in comparison to OMMT, demonstrating the diffusion capability of molten PEG oligomer molecules into the layered gallery of OMMT during the heat treatment process. The XRD diffraction results of P-OMMT powders confirm that PEG intercalates into the OMMT clay gallery and present as a co-intercalant, in addition to the organic modifier (dimethyl dyhydrogenated tallow quaternary ammonium), with in the OMMT gallery. Further increase of interlayer spacing of OMMT due to the PEG treatment will significantly reduce the interaction between OMMT layers. In addition, intercalation of PEG into the OMMT gallery reduces the surface energy of OMMT resulting in more organophilic clay powder. As a result of above, P-OMMT clay would help to enhance the exfoliation efficiency when NR/clay nanocomposite is prepared

Example 4

Effect of Maleated Natural Rubber (MNR) to OMMT Ratio on Exfoliation and Mechanical Properties Natural rubber/OMMT nanocomposite/compound was prepared in the presence of maleated natural rubber as an exfoliating promoter (compatibilizing agent). Natural rubber was melt blended with OMMT in the presence of MNR in an Internal Mixer. In addition, as shown in Table 4, curing ingredients (ZnO, stearic acid, sulfer and MBTS) and antioxidants (IPPD) were also melt mixed with the natural rubber and OMMT clay in the Haake Internal Mixer at pre-determined mixing conditions (rotor speed, mixing temp., mixing time and mixing cycle). Initially a high shear rate of 80 rpm for 8 min. followed by a lower shear rate of 60 rpm for 5 min. was used as the two stage mixing cycle for the preparation of NR/OMMT nanocomposite. The composition of the NR/OMMT nanocomposite prepared in this example is shown in Table 5.

TABLE 4

Formulation for NR/OMMT nanocomposites

| Component | Phr (Parts per hundred of rubber) |
|---|---|
| Natural rubber (RSS grade) | 100 |
| OMMT | 4 |
| Maleated natural rubber (MNR) | 4-32* |
| ZnO | 5 |
| Stearic acid | 1 |
| Sulfur | 2.5 |
| MBTS (Mercaptobenzothiazole disulphide) | 1 |
| IPPD (n-isopropyl n-phenyl n-phenylenediammine) | 1 |

*Different loading levels of maleated natural rubber

The ratio of MNR to OMMT was varied from 1:1 to 8:1 in the NR/OMMT nanocomposite to determine the optimum ratio for achieving the maximum level of intercalation and exfoliation of OMMT during the melt mixing process. Table 5 shows the ratio of maleated natural rubber to OMMT in the NR/OMMT nanocomposite. The compound prepared according to Table 4 is cured into a 2 mm thick sheet by compression molding at 150° C. for a optimum curing time ($t_{90}$) obtained from the curing testing to evaluate the nanocomposite structure and mechanical properties.

The cured NR/OMMT nanocomposite (vulcanizate) structures and tensile properties were characterized to evaluate the MNR to OMMT ratio needed to achieve the maximum level of exfoliation and subsequent property enhancement. As shown in FIG. 5, X-ray diffraction peaks of NR/OMMT nanocomposite vulcanizates prepared in the presence of MNR were shifted towards lower Bragg angles compared to OMMT.

Shifting of diffraction peaks of NR/OMMT nanocomposite vulcanizate to lower Bragg angles, indicates the intercalation of maleated natural rubber into the clay interlayer spacing and as a result led to an increase the interlayer distance between clay platelets. The interlayer distance of OMMT in each of the NR/OMMT nanocomposite prepared with different ratios of maleated natural rubber to OMMT is shown in Table 5.

TABLE 5

Interlayer spacing of natural rubber (NR)/OMMT nanocomposite prepared with different ratios of maleated natural rubber (MNR) to OMMT

| Nanocomposite* | MNR:OMMT Ratio | Peak Position Two theta, (°) | Interlayer spacing (Å) |
|---|---|---|---|
| OMMT | — | 3.71 | 23.7 |
| NR-OMMT | — | 2.26 | 40.6 |
| NR-MNR (4) | 1:1 | 1.99 | 44.3 |
| NR-MNR (8) | 2:1 | 2.14 | 41.2 |
| NR-MNR (12) | 3:1 | 1.94 | 45.6 |
| NR-MNR (20) | 5:1 | 2.01 | 43.8 |
| NR-MNR (32) | 8:1 | 2.03 | 43.3 |

*For all nanocomposites, the OMMT loading level was 4 phr and the MNR loading level was given within the parenthesis.

As shown in Table 5, interlayer distance of original OMMT is 23.7 Å. When NR/OMMT nanocomposite was prepared in the presence of maleated natural rubber (NR-MNR(4)-NR-MNR(32)), the interlayer spacing of OMMT within the nanocomposite vulcanizate was increased compared to that of OMMT and NR/OMMT composite prepared without adding any maleated natural rubber. The driving force for intercalation of maleated natural rubber into the clay galleries is due to the polar maleic anhydride group attached onto the natural rubber. The polar maleic anhydride group is compatible with OMMT and as a result, during the melt compounding process, maleated natural rubber effectively intercalates into the clay galleries, resulting in a higher interlayer distance. However, the highest interlayer distance was achieved when 12 phr of maleated natural was mixed with 4 phr of OMMT (NR-MNR(12), Table 5). This higher interlayer distance further facilitates the exfoliation of OMMT into smaller stacks (which are in the nanoscale) in the rubber matrix during the compounding process due to the weakening of interactive forces between the individual layers of OMMT.

NR/OMMT nanocomposites were analyzed for stress-strain properties to evaluate effect of MNR within the nanocomposite. FIG. 6 and Table 6 respectively show stress-strain curves and tensile properties for NR/OMMT nanocomposite vulcanizate.

TABLE 6

Tensile properties for NR/OMMT nanocomposites prepared with different ratios of maleated natural rubber (MNR) to OMMT.

| NR/OMMT Nano-composite* | Tensile Strength MPa | 100% Modulus MPa | 300% Modulus MPa | 500% Modulus MPa | Elongation at Break % |
|---|---|---|---|---|---|
| NR-OMMT | 15.6 | 1.1 | 2.6 | 7.5 | 630 |
| NR-MNR(4) | 15.0 | 0.9 | 2.0 | 4.8 | 690 |
| NR-MNR(8) | 15.4 | 1.0 | 2.1 | 5.2 | 687 |
| NR-MNR(12) | 17.3 | 1.0 | 2.1 | 5.6 | 640 |
| NR-MNR(20) | 17.8 | 0.9 | 2.1 | 4.9 | 660 |
| NR-MNR(32) | 15.5 | 0.9 | 2.0 | 4.9 | 650 |

*For all nanocomposites, OMMT loading level was 4 phr and MNR loading level is given within the parenthesis As shown in Table 6, tensile strength of NR/OMMT nanocomposites increases with the addition of maleated natural rubber. Tensile strength of NR-MNR(12) and NR-MNR(20) increased up to 17.3 MPa and 17.8 MPa, respectively, in comparison to 15.6 MPa obtained for NR-OMMT composite prepared without the addition of maleated natural rubber. Intercalation of maleated natural rubber into the interlayer spacing of OMMT significantly enhances OMMT exfoliation and subsequent dispersion, at nanoscale, uniformly throughout the rubber matrix. Higher degree of exfoliation would lead to strong interfacial interaction between OMMT and the rubber matrix and as a result, the tensile strength of NR/OMMT nanocomposite prepared in the presence of maleated natural rubber is increased compared to that of NR/OMMT composite. However, tensile modulus of NR/OMMT nanocomposites was not improved by incorporating maleated natural rubber as shown in Table 6. This could be due to the addition of relatively low molecular weight maleated natural rubber (high temperature grafting of maleic anhydride onto the NR will result in low molecular weight MNR) into the NR/OMMT nanocomposite.

Based on X-ray diffraction and stress-strain property measurements, it was decided that a ratio of MNR 3:OMMT 1 is the optimum ratio for achieving the maximum degree of exfoliation of OMMT in the rubber matrix.

Example 5

Preparation of NR Nanocomposite Comprising P-OMMT Prepared in Example 3, in the Presence of Maleated Natural Rubber NR/P-OMMT nanocomposite was prepared by melt mixing/compounding of natural rubber with P-OMMT prepared in example 3 in the presence of maleated natural rubber and other curing and protective chemicals in the Haake Internal mixer. The mixing cycle used in this example is the same as the example 4. The NR/P-OMMT nanocomposite formulation is shown in Table 7

TABLE 7

NR/P-OMMT nanocomposite formulation

| Component | NR/OMMT nanocomposite Phr | NR/P-OMMT nanocomposite |
|---|---|---|
| Natural rubber (RSS) | 88 | 88 |
| P-OMMT | — | 4 |
| OMMT | 4 | — |
| Maleated natural rubber | 12 | 12 |
| ZnO | 5 | 5 |
| Stearic acid | 1 | 1 |
| Sulfur | 1.75 | 1.75 |
| MBS (N-morpholinothio-benzothiazole) | 1.5 | 1.5 |
| IPPD (n-isopropyl n-phenyl n-phenylenediammine | 1 | 1 |

The NR/P-OMMT nanocomposite vulcanizate (cured compound) was prepared by compression molding the nanocomposite into 2 mm thickness sheets according to the pre-determined vulcanization parameters.

The morphology/structure of P-OMMT in the nanocomposite vulcanizate sheets were characterized using XRD and SEM techniques. FIG. 7 shows the XRD spectrum of NR/P-OMMT nanocomposite vulcanizate in comparison to the XRD spectrum of NR/OMMT nanocomposite vulcanizate and peak position and interlayer distance of OMMT in two nanocomposites are shown Table 8.

TABLE 8

X-ray diffraction peak positions and Interlayer distance of NR/P-OMMT nanocomposites and NR/OMMT nanocomposites

| Nanocomposite | OMMT:PEG ratio | Peak position Two theta, ° | Interlayer distance Å |
|---|---|---|---|
| OMMT | — | 3.71 | 23.7 |
| NR-OMMT(4) | 1:0 | 1.98 | 44.5 |
| NR-P-OMMT(4) | 1:0.25 | 1.78 | 49.5 |

As shown in XRD results, 001 diffraction peak of OMMT in the NR/OMMT nanocomposite prepared with 4 phr of OMMT in the presence of maleated natural rubber (formulation is shown in Table 7) is at 1.98°. However, when the NR was melt mixed with 4 phr of P-OMMT in the presence of maleated natural rubber and make the NR/P-OMMT nanocomposite (formulation is shown in Table 7), the 001 diffraction peak of P-OMMT is further shifted to a lower Bragg angle and appeared as small shoulder at 1.78°, indicating a higher degree of exfoliation of P-OMMT. As a result of this, interlayer spacing of P-OMMT in the nanocomposite increased to 49.5 Å compared to 44.5 Å interlayer spacing of NR/OMMT nanocomposite. These results clearly indicate that P-OMMT is further intercalated by maleated natural rubber and subsequent exfoliation the P-OMMT clay uniformly in the NR matrix during the melt mixing process. Higher interlayer spacing and less surface energy of P-OMM, due to the surface modification by PEG, facilitate the intercalation of NR molecules along with functionalized NR (MNR) and subsequent exfoliation during the melt compounding process.

The uniform distribution of exfoliated P-OMMT in the nanocomposite materials is shown in SEM image of NR/P-OMMT nanocomposite structure shown in FIG. 8.

Solid state mechanical properties of NR/P-OMMT nanocomposite vulcanizate were analyzed in comparison to the gum rubber compound and NR/OMMT nanocomposite vulcanizate to evaluate the P-OMMT effect on mechanical performances of the nanocomposite. Table 9 shows the mechanical performances of gum compound (containing no OMMT), NR/OMMT and NR/P-OMMT nanocomposites.

TABLE 9

Mechanical properties of NR/OMMT and NR/P-OMMT nanocomposite vulcanizate

| Mechanical properties | NR-gum compound | NR-OMMT(4) nanocomposite | NR-POMMT(4) nanocomposite |
|---|---|---|---|
| Tensile strength, MPa | 18.78 | 25.22 | 26.45 |
| 100% modulus, MPa | 0.78 | 1.02 | 1.10 |
| 300% modulus, MPa | 1.82 | 2.96 | 3.56 |
| 500% modulus, MPa | 4.60 | 15.38 | 19.42 |
| Elongation at break % | 727 | 576 | 548 |
| Tear strength, N/mm | 29.16 | 32.37 | 33.65 |
| Hardness, Shore A | 36.4 | 44.4 | 45.7 |

As shown in Table 9, mechanical performances of both NR/OMMT(4) and NR/P-OMMT(4) nanocomposites are higher than the gum compound. However in comparison to both nanocomposites, NR/P-OMMT(4) nanocomposite shows an enhancement in mechanical properties compared to that of NR/OMMT (4). This could be explained because the degree of exfoliation of P-OMMT in the NR-P-OMMT nanocomposite material is significantly higher than that of OMMT in the NR/OMMT nanocomposite material. The higher degree of exfoliation would result in increasing the specific surface area and aspect ratio of OMMT clay layers within NR matrix. As a result strong interaction is achieved between OMMT clay platelets and NR molecules through maleated natural rubber and PEG molecules attached to the clay. This high aspect ratio and strong interaction between P-OMMT and the NR matrix would result in a higher mechanical performance of the NR/P-OMMT(4) nanocomposite compared with the NR/OMMT(4) nanocomposite.

Example 6

Effect of Incorporation of Inert Filler (CaCO$_3$) into the Natural Rubber/OMMT Nanocomposites Prepared (in Example 4) in the Presence of Maleated Natural Rubber Different loading levels of CaCO$_3$ were melt mixed with the formulation used to prepare NR-MNR (12) nanocomposite in the Haake Internal Mixer (shown in Table 4). The effect of CaCO$_3$ loading levels on the properties of NR/OMMT nanocomposite prepared by incorporating maleated natural rubber was evaluated. The exact compositions for each nanocomposite are given in Table 10 basic mixing conditions are similar to those used in the preparation of NR-MNR(12) nanocomposite described in Example 4.

The resultant nanocomposite structure comprising natural rubber, OMMT, maleated natural rubber, and CaCO$_3$ was analyzed for curing and mechanical properties. FIG. 9 shows the curing behavior of NR/OMMT nanocomposites containing different loading levels of CaCO$_3$. The effect of incorporating CaCO$_3$ into NR/OMMT nanocomposites on vulcanization parameters is shown in Table 11.

TABLE 10

Composition of nanocomposites/composites prepared by incorporating OMMT and inert filler, CaCO$_3$.

| Composite* | OMMT Phr | Maleated natural Rubber (MNR) phr | CaCO$_3$ Phr |
|---|---|---|---|
| NR-OMMT(4) | 4 | — | — |
| NR-OMMT(4)-30 | 4 | — | 30 |
| NR-30 | — | — | 30 |
| NR-MNR(12) | 4 | 12 | — |
| NR-MNR(12)-30 | 4 | 12 | 30 |
| NR-MNR(12)-50 | 4 | 12 | 50 |
| NR-MNR(12)-70 | 4 | 12 | 70 |

*All composites consist of curing ingredients as shown in Table 4, in addition to the main ingredients shown in Table 10. The numbers 30, 50, and 70 refer to loading levels of CaCO$_3$ in phr.

As shown in Table 11, curing properties, especially the scorch time and the curing time, of the NR/nanocomposites were not significantly changed when CaCO$_3$ was incorporated. The scorch time (ts$_2$) and the cure time (t$_{90}$) of NR-MNR(12) are 1.28 min. and 4.58 min., respectively. However when CaCO$_3$ is added into the formulation of NR-MNR(12), the scorch time and cure time were not significantly changed. As expected, both minimum torque (ML) and maximum torque (MH) were increased with the increase of the CaCO$_3$ loading levels in the NR/OMMT nanocomposite prepared in the presence of maleated natural rubber.

The effect of CaCO$_3$ on hardness of NR/OMMT nanocomposite vulcanizates is shown in FIG. 10. As expected, hardness of NR-MNR(12) nanocomposite vulcanizate gradually increases with the increase of CaCO$_3$ loading levels. As shown in FIG. 10, NR-MNR(12) shows a lower hardness than NR-OMMT(4) composite prepared without maleated natural rubber. Addition of low molecular weight maleated natural rubber to NR/OMMT composite causes the reduction of hardness.

TABLE 11

Curing properties natural rubber-OMMT nanocomposite containing different loading levels of CaCO$_3$.

| Composite* | Minimum Torque (ML, kgf cm) | Maximum torque (MH, Kgf cm) | Scorch time (ts$_2$, min.) | Curing time (t$_{90}$, min) | Cure rate index (CRI) |
|---|---|---|---|---|---|
| NR-OMMT(4) | 1.33 | 9.35 | 1.13 | 4.43 | 5.08 |
| NR-MNR(12) | 0.89 | 7.93 | 1.28 | 4.58 | 3.91 |
| NR-MNR(12)-30 | 1.12 | 9.91 | 1.15 | 4.49 | 5.25 |
| NR-MNR(12)-50 | 1.32 | 12.54 | 1.1 | 4.52 | 6.87 |
| NR-MNR(12)-70 | 1.53 | 14.5 | 1.07 | 4.42 | 8.36 |

*All composites consist of curing ingredients as shown in Table 4, in addition to the main ingredients shown in Table 10. The numbers 30, 50 and 70 refer to loading levels of CaCO$_3$ in phr.

FIGS. 11 and 12 show how tensile stress-strain properties are affected when inert $CaCO_3$ is incorporated to the NR-MNR(12) nanocomposite prepared by melt mixing of natural rubber with 4 phr of OMMT in the presence of 12 phr of maleated natural rubber. Generally, addition of inert fillers such as $CaCO_3$ or kaolin clay would reduce the strength characteristics, especially tensile strength, of a rubber vulcanizate. As shown in FIGS. 11 and 12, when NR/OMMT nanocomposite was prepared with 4 phr OMMT and 12 phr of maleated natural rubber (NR-MNR(12), the tensile strength was about 17.3 MPa. During the melt mixing process, OMMT exfoliates into individual layers/smaller stacks (which are in the nanoscale) within the rubber matrix in the presence of maleated natural rubber. A strong interfacial interaction between the rubber matrix and the nanostructured OMMT through maleated natural rubber is the main reason for achieving this higher tensile strength.

However, when $CaCO_3$ was melt blended with the formulation similar to NR-MNR(12), tensile characteristics were not significantly affected (FIGS. 11 and 12). As shown in FIG. 12, tensile strength of NR-MNR(12)-30 and NR-MNR(12)-50 is 17.8 MPa and 17.2 MPa, respectively. As a result, strength characteristics of the nanocomposite loaded with $CaCO_3$, especially at 30 and 50 phr levels, is retained at the same level to that of NR-MNR(12) nanocomposite prepared without $CaCO_3$.

FIG. 13 shows the effect of adding different loading levels of $CaCO_3$ on tensile modulus of NR/OMMT nanocomposite vulcanizate. As shown in FIG. 13, tensile modulus of NR-MNR(12) nanocomposite is not comparable with a conventional carbon black rubber compound containing higher loading levels of carbon black (30-50 phr). This is because low loading levels (4 phr) of OMMT does not provide an adequate stiffness to the nanocomposite structure. However, by incorporating $CaCO_3$, to the nanocomposite structure, modulus is increased drastically compared to that of nanocomposite structure without $CaCO_3$ (FIG. 13).

FIG. 14 and Table 12 show the comparison of tensile stress-strain properties between the conventional composite vulcanizate prepared by melt mixing of NR with $CaCO_3$ (NR-30) and the NR/OMMT nanocomposite vulcanizate comprising $CaCO_3$. As shown in Table 12, tensile strength of NR-OMMT (4) is 15.2 MPa. When 30 phr of $CaCO_3$ is incorporated into the NR-OMMT(4) composite, the tensile strength of the resulting NR-OMMT(4)-30 composite is 14.8 MPa. Tensile strength of NR-MNR(12) nanocomposite is 17.3 MPa (Table 12). However, when 30 phr of CaCO3 is incorporated into the NR-MNR(12), the tensile strength of the NR-MNR(12)-30 nanocomposite is 17.8 MPa. This indicates that strength characteristics achieved in the nanocomposite structure due to the effective exfoliation of OMMT in the natural rubber matrix does not deteriorate by the addition of $CaCO_3$.

TABLE 12

Comparative tensile properties of NR/OMMT nanocomposites and conventional composites prepared with $CaCO_3$.

| Nanocomposite* | Tensile strength MPa | 300% Modulus MPa | 500% Modulus MPa | Elongation at break, % |
|---|---|---|---|---|
| NR-30 | 12 | 1.49 | 3.51 | 640 |
| NR-OMMT(4) | 15.2 | 1.96 | 4.72 | 630 |
| NR-OMMT(4)-30 | 14.8 | 3.01 | 8.5 | 599 |
| NR-MNR(12) | 17.3 | 2.5 | 5.58 | 600 |
| NR-MNR(12)-30 | 17.8 | 2.77 | 7.45 | 620 |

*All composites except NR-30 consisted of 4 phr of OMMT. Number 30 refers to parts per hundred of $CaCO_3$ in the nanocomposites.

Example 7

Effect of Secondary Reinforcing Filler (Carbon Black) and Non-reinforcing Filler ($CaCO_3$ or Coated $CaCO_3$ or Mixture of the Two) on the Nanocomposites Prepared in Example 4 and 5

Reinforcing filler or reinforcing filler together with an inert filler was melt mixed with natural rubber in the presence of OMMT/P-OMMT, maleated natural rubber, and other curing chemicals in the Haake Internal Mixture, similar to the example 5. The natural rubber nanocomposite containing a nanomaterial (OMMT) and conventional fillers (carbon black, $CaCO_3$) was vulcanized at a higher temperature (150° C.) to prepare the nanocomposite vulcanizate. The exact composition of each natural rubber-clay nanocomposite (NRCN) and conventional natural rubber composite (NRCC) vulcanizate containing carbon black and $CaCO_3$ is shown in Table 13. All nanocomposites were cured using the similar curing system shown in example 5 (Table 7).

TABLE 13

Composition for NR-clay nanocomposites (NRCN)

| Nanocomposite vulcanizate | NR Phr | OMMT Phr | P-OMMT Phr | Maleated natural rubber (MNR) Phr | Carbon black Phr | $CaCO_3$ Phr | Coated $CaCO_3$ Phr |
|---|---|---|---|---|---|---|---|
| NRCC | 100 | — | — | — | 30 | 90 | — |
| NRCN-1 | 88 | 4 | — | 12 | 15 | 70 | — |
| NRCN-2 | 88 | — | 4 | 12 | 15 | 70 | — |
| NRCN-3 | 88 | — | 4 | 12 | 15 | 40 | 30 |
| NRCN-4 | 88 | — | 4 | 12 | 20 | 60 | 30 |

All nanocomposites shown in Table 13 are analyzed for mechanical properties. Table 14 shows the mechanical performances for each NRCN containing different loading levels of secondary reinforcing filler (carbon black) and non-reinforcing filler ($CaCO_3$) and conventional NR composite (NRCC).

TABLE 14

Mechanical properties for NR-clay nanocomposites

| Vulcanizate mechanical properties | NRCC | NRCN-1 | NRCN-2 | NRCN-3 | NRCN-4 |
|---|---|---|---|---|---|
| Te. strength, MPa | 15.8 | 17.9 | 19.48 | 17.35 | 17.50 |
| 100% modulus, MPa | 2.71 | 2.35 | 2.33 | 2.59 | 3.50 |
| 300% modulus, MPa | 8.71 | 6.65 | 8.75 | 9.65 | 10.29 |
| Elongation at break % | 421 | 495 | 452 | 420 | 420 |
| Hardness, Shore A | 65 | 62.2 | 62.8 | 64.9 | 67.7 |
| Tear strength, N/mm | 32.14 | 32.84 | 37.81 | 36.19 | 41.23 |
| Rebound resilience | 60 | 72 | 72 | 67 | 67 |
| Heat build-up, ° C. | 14 | 10 | 10 | 10 | 11 |

As shown in Table 14, addition of a secondary reinforcing filler (15 phr of carbon black) in addition to OMMT or P-OMMT significantly increases the mechanical properties, especially modulus and hardness. However, it is shown that mechanical properties of the nanocomposites (NRCN-3 and NRCN-4) are further enhanced when the $CaCO_3$ is replaced with the mixture of coated and uncoated $CaCO_3$. However, more importantly, all NR nanocomposite vulcanizates show a good reinforcement whilst maintaining a good elasticity, as shown in rebound resilience, compared to that of the conventional NR vulcanizate (NRCC) comprising only carbon black and $CaCO_3$. Good elastic properties in NR nanocomposites is caused to maintain a lower value for heat build-up, which is an important parameter for a middle layer of solid rubber tyres, than the conventional NR vulcanizate (NRCC) as shown in Table 14.

Mechanical performances of all the NR nanocomposites (NRCN) shown in Table 14 are either comparable or better than the conventional NR vulcanizate (NRCC).

That which is claimed:

1. A cured nanocomposite comprising:
   a. an exfoliated phyllosilicate clay comprising an organically modified montmorillonite present in an amount in the range of about 4 to 8 phr, wherein the organically modified montmorillonite has been treated with polyethylene glycol (PEG) such that the ratio of organically modified montmorillonite to PEG falls within the range of 1:0.25-1:0.75;
   b. an exfoliating promoter selected from an anhydride group grafted elastomer present in an amount in the range of about 12 to 18 phr;
   c. a natural rubber containing (a) and (b) dispersed therein;
   d. a curing system comprising ZnO, stearic acid, sulfur, an accelerator, and an antioxidant;
   e. an inert filler comprising $CaCO_3$ present in the range of about 30 to 90 phr; and
   f. a reinforcing filler comprising coated $CaCO_3$ present in the range of about 10 to 30 phr, wherein the cured nanocomposite (nanocomposite vulcanizate) has a tensile strength in the range of about 16 to 20 MPa and a tensile modulus of 100% elongation at 2.5 to 3 MPa; and of 300% elongation at 8.5 to 12 MPa as measured by ISO 37: 2005 (E).

2. The cured nanocomposite of claim 1 wherein the cured nanocomposite (nanocomposite vulcanizate) has a rebound resilience in the range of 68 to 75 as measured by ISO 4662-1986 (E).

3. The cured nanocomposite of claim 1 wherein the cured nanocomposite (nanocomposite vulcanizate) has a heat buildup as measured in the range 8 to 10 deg C.

4. The cured nanocomposite of claim 1 further comprising silica or carbon black or a mixture thereof as an additional reinforcing filler.

5. The cured nanocomposite of claim 1 wherein the exfoliating promoter is maleated natural rubber or both maleated natural rubber and polyethylene glycol.

6. A process for preparing a nanocomposite comprising:
   i. providing
      a. a phyllosilicate clay comprising a organically modified montmorillonite present in an amount in the range of about 4 to 8 phr, wherein the organically modified montmorillonite has been treated with polyethylene glycol (PEG) such that the ratio of organically modified montmorillonite to PEG falls within the range of 1:0.25-1:0.75;
      b. an exfoliating promoter selected from an anhydride group grafted elastomer, present in an amount in the range of about 8 to 18 phr;
      c. a natural rubber containing (a) and (b) dispersed therein;
      d. a curing system comprising ZnO, stearic acid, sulfur, an accelerator, and an antioxidant;
      e. an inert filler comprising $CaCO_3$ in the range of about 30 to 90 phr;
      f. a reinforcing filler comprising coated $CaCO_3$ in the range of about 10 to 30 phr (leave alone); and
   ii. exfoliating the phyllosilicate clay by melt compounding/melt mixing of (a) with (c) in the presence of the other components (b, d, e, and f), and
   iii. curing the resulting nanocomposite to form the cured nanocomposite, wherein the cured nanocomposite (nanocomposite vulcanizate) has a tensile strength in the range of about 16 to 20 MPa and a tensile modulus of 100% elongation at 2.5 to 3 MPa; and of 300% elongation at 8.5 to 12 MPa as measured by ISO 37: 2005 (E).

7. The process of claim 6 wherein the exfoliating of the phyllosilicate clay is carried out by melt mixing under high shear rate between 75 rpm and 85 rpm followed by a low shear rate between 55 rpm and 65 rpm.

8. The process of claim 6 wherein the curing occurs at a temperature between 130 -160° C. and a pressure between 15-25 MPa.

9. The cured nanocomposite of claim 1 wherein the coated $CaCO_3$ is $CaCO_3$ coated with a long chain fatty acid, and the long chain fatty acid is a stearic acid.

10. A cured nanocomposite prepared by the process of claim 6.

11. A cured nanocomposite comprising:
   a. an exfoliated phyllosilicate clay comprising an organically modified montmorillonite present in an amount in the range of about 2 to 12 phr, wherein the organically modified montmorillonite has been treated with polyethylene glycol (PEG) such that the ratio of organically modified montmorillonite to PEG falls within the range of 1:0.25-1:0.75;
   b. an exfoliating promoter selected from an anhydride group grafted elastomer present in an amount in the range of about 2 to 18 phr;
   c. a natural rubber containing (a) and (b) dispersed therein;
   d. a curing system comprising ZnO, stearic acid, sulfur, an accelerator, and an antioxidant; and
   e. an inert filler comprising $CaCO_3$ present in the range of about 30 to 90 phr; and
   f. a reinforcing filler comprising coated $CaCO_3$ in the range of about 10 to 30 phr, wherein the cured nanocomposite (nanocomposite vulcanizate) has a tensile strength in the range of about 16 to 20 MPa and a tensile modulus of 100% elongation at 2.5 to 3 MPa; and of 300% elongation at 8.5 to 12 MPa as measured by ISO 37: 2005 (E).

12. The process of claim 6 wherein carbon black is additionally provided during the melt compounding/melt mixing.

* * * * *